(12) United States Patent
Seegmiller et al.

(10) Patent No.: US 10,359,863 B2
(45) Date of Patent: Jul. 23, 2019

(54) DRAGGING VIRTUAL ELEMENTS OF AN AUGMENTED AND/OR VIRTUAL REALITY ENVIRONMENT

(71) Applicant: Google Inc., Mountain View, CA (US)

(72) Inventors: Matthew Seegmiller, Mountain View, CA (US); Adam Glazier, Oakland, CA (US); Dominik Philemon Kaeser, Mountain View, CA (US); Per Karlsson, Mountain View, CA (US); Evan Hardesty Parker, Los Altos, CA (US); Chun-Po Wang, Union City, CA (US); Matthias Buhlmann, Wollerau (CH)

(73) Assignee: GOOGLE LLC, Mountain View, CA (US)

( * ) Notice: Subject to any disclaimer, the term of this patent is extended or adjusted under 35 U.S.C. 154(b) by 8 days.

(21) Appl. No.: 15/684,314

(22) Filed: Aug. 23, 2017

(65) Prior Publication Data
US 2018/0136743 A1 May 17, 2018

Related U.S. Application Data

(60) Provisional application No. 62/422,384, filed on Nov. 15, 2016.

(51) Int. Cl.
*G06F 3/0346* (2013.01)
*G06F 3/01* (2006.01)
(Continued)

(52) U.S. Cl.
CPC .......... *G06F 3/0346* (2013.01); *A63F 13/211* (2014.09); *A63F 13/212* (2014.09);
(Continued)

(58) Field of Classification Search
CPC ........ G06F 3/0346; G06F 3/011; G06F 3/017; G06F 3/04815; G06F 3/04845;
(Continued)

(56) References Cited

U.S. PATENT DOCUMENTS

| 9,311,741 B2 | 4/2016 | Rogers et al. |
| 2004/0085335 A1* | 5/2004 | Burlnyk .............. G06F 3/04815 715/716 |

(Continued)

OTHER PUBLICATIONS

Sherstyuk et al. (Andrei Sherstyuk, A., Vincent, D., Wang, K.L.; "Making first steps in VR: monitoring user progress in virtual travel", VRST '10 Proceedings of the 17th ACM Symposium on Virtual Reality Software and Technology, pp. 19-26, doi>10.1145/1889863.1889866, retrieved from web on Oct. 25, 2018).*

Extended European Search Report for European Application No. 17193763.4, dated Feb. 7, 2018, 12 pages.

International Search Report and Written Opinion for PCT Patent Application No. PCT/US2017/048418, dated Nov. 7, 2017, 15 pages.

(Continued)

*Primary Examiner* — Mark Edwards
(74) *Attorney, Agent, or Firm* — Brake Hughes Bellermann LLP

(57) ABSTRACT

In a system for moving, or dragging, a virtual reality environment, a user wearing a head mounted display (HMD) device may be at a first physical position in a physical space, corresponding to a first virtual position in the virtual environment. The user may select a second virtual position in the virtual environment by, for example, manipulation of a handheld electronic device operably coupled to the HMD. The system may construct a three dimensional complex proxy surface based on the first and second virtual positions, and may move the virtual elements of the virtual environment along the proxy surface. This movement of the virtual environment may be perceived by the user as a move from the first virtual position to the second virtual position, although the user may remain at the first physical position within the physical space.

20 Claims, 17 Drawing Sheets

(51) Int. Cl.
*G06F 3/0481* (2013.01)
*G06F 3/0484* (2013.01)
*A63F 13/525* (2014.01)
*G06F 1/16* (2006.01)
*A63F 13/428* (2014.01)
*A63F 13/211* (2014.01)
*A63F 13/213* (2014.01)
*A63F 13/212* (2014.01)
*G06T 19/00* (2011.01)
*A63F 13/2145* (2014.01)

(52) U.S. Cl.
CPC .......... *A63F 13/213* (2014.09); *A63F 13/428* (2014.09); *A63F 13/525* (2014.09); *G06F 1/163* (2013.01); *G06F 3/011* (2013.01); *G06F 3/017* (2013.01); *G06F 3/04815* (2013.01); *G06F 3/04842* (2013.01); *G06F 3/04845* (2013.01); *A63F 13/2145* (2014.09); *G06T 19/006* (2013.01)

(58) Field of Classification Search
CPC ...... G06F 1/163; A63F 13/211; A63F 13/212; A63F 13/428; A63F 13/525; A63F 13/2145; G06T 19/006
See application file for complete search history.

(56) References Cited

U.S. PATENT DOCUMENTS

| | | |
|---|---|---|
| 2014/0282162 A1 | 9/2014 | Fein et al. |
| 2014/0337734 A1 | 11/2014 | Day et al. |
| 2016/0257000 A1 | 9/2016 | Hager et al. |
| 2016/0306431 A1* | 10/2016 | Stafford .................. G06F 3/014 |
| 2017/0185261 A1 | 6/2017 | Perez et al. |

OTHER PUBLICATIONS

Sherstyuk et al., "Making First Steps in VR: Monitoring User Progress in Virtual Travel", Proceedings of 17th ACM Symposium on Virtual Reality Software and Technology, Nov. 22-24, 2010, pp. 19-26.

Kopf et al., "First-person Hyper-lapse Videos", ACM Transactions on Graphics, vol. 33, No. 4, Article 78, Jul. 2014, 10 pages.

Fischer et al., "Finding Hidden Objects in Large 3D Environments: The Supermarket Problem", XIII Symposium on Virtual Reality, 2011, pp. 79-88.

KULIK, "Building on Realism and Magic for Designing 3D Interaction Techniques", IEEE Computer Graphics and Applications, Nov./Dec. 2009, pp. 22-33.

Ware et al., "Exploration and Virtual Camera Control in Virtual Three Dimensional Environments", Proceedings of Symposium on Interactive 3D Graphics, 1990, pp. 175-183.

* cited by examiner

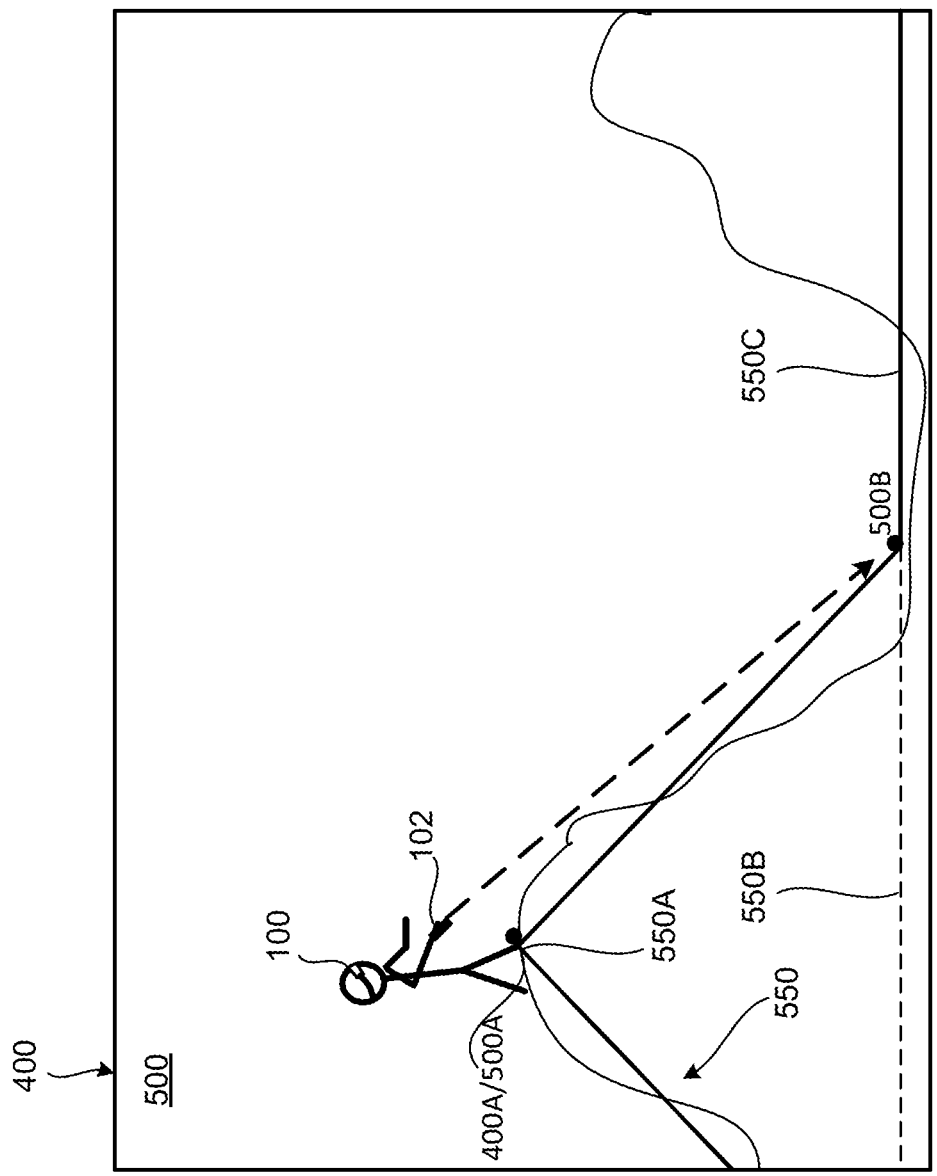

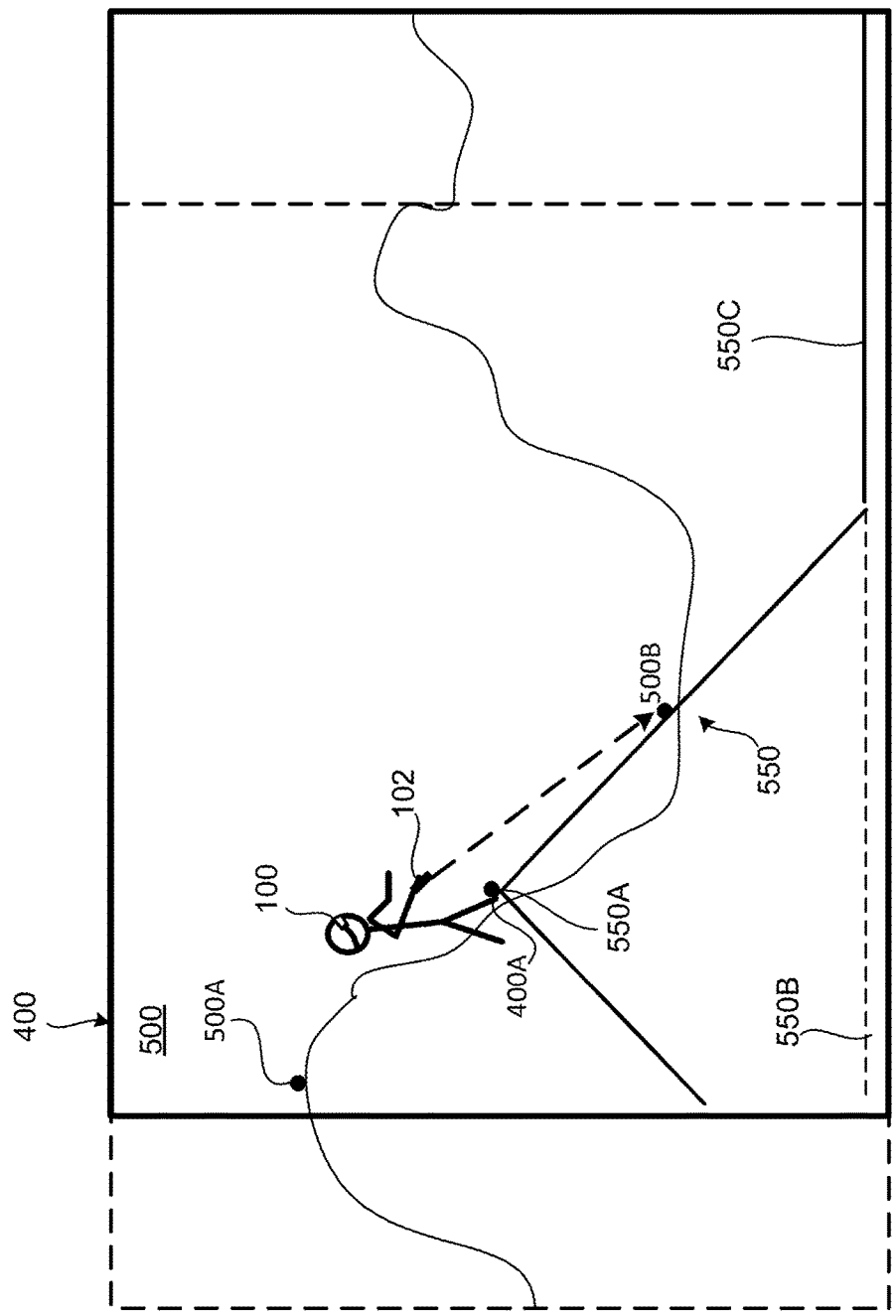

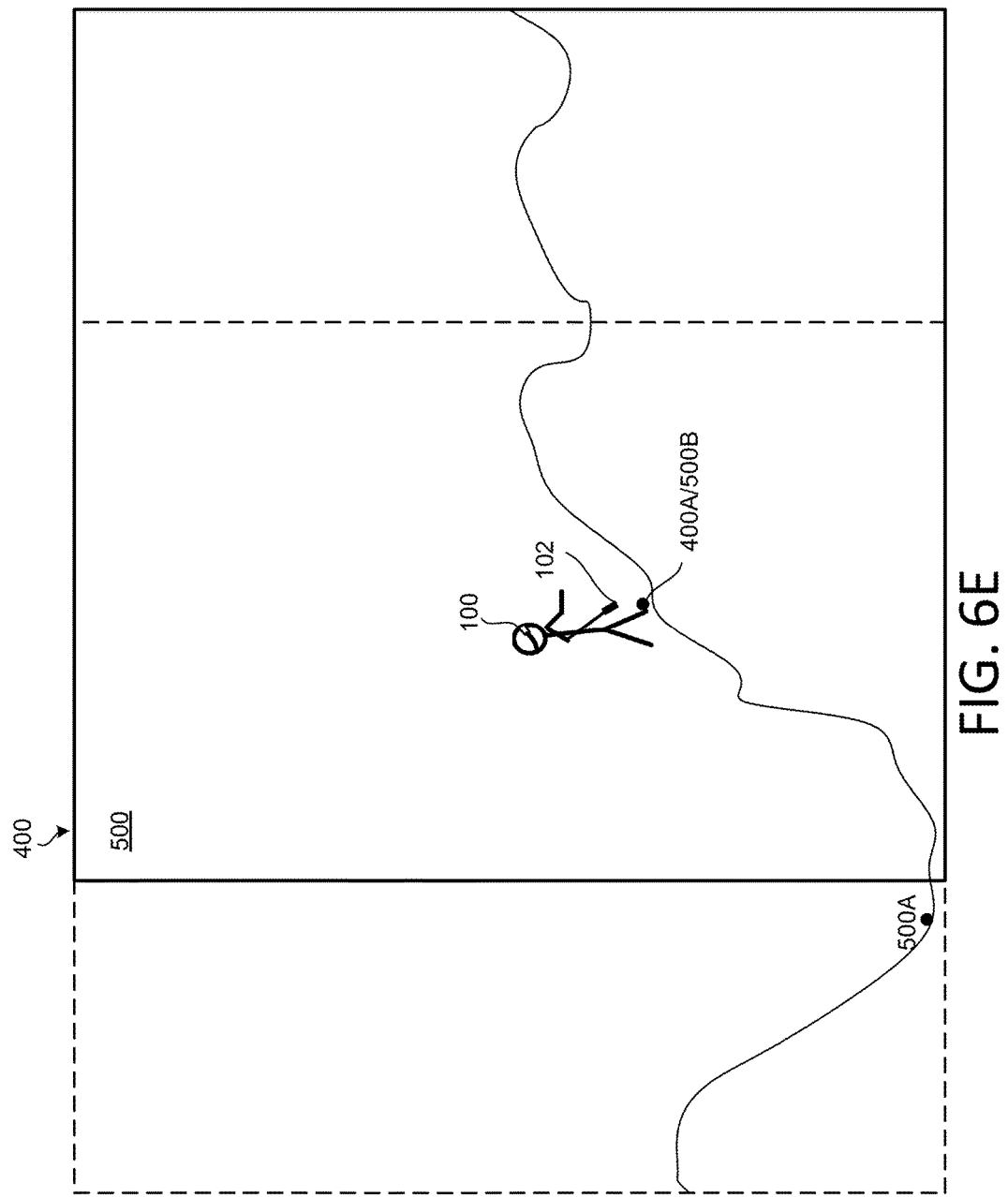

DRAGGING VIRTUAL ELEMENTS OF AN AUGMENTED AND/OR VIRTUAL REALITY ENVIRONMENT

CROSS REFERENCE TO RELATED APPLICATION(S)

This application is a Non-Provisional of, and claims priority to, U.S. Provisional Application No. 62/422,384, filed on Nov. 15, 2016, the disclosure of which is incorporated by reference herein in its entirety.

FIELD

This document relates, generally, to moving virtual elements in a virtual reality environment.

BACKGROUND

An augmented reality (AR) and/or virtual reality (VR) system may generate an immersive, three-dimensional (3D) virtual environment. A user may interact with virtual objects, elements, features and the like in this virtual environment using various electronic devices, such as, for example, a helmet or other head mounted device including a display, glasses or goggles that a user looks through when viewing a display device, one or more external electronic devices such as controllers, joysticks and the like, gloves fitted with sensors, keyboards, mouse, and other electronic devices. While immersed in the virtual environment, the user may move through the virtual environment, and may manipulate and interact with virtual elements of the virtual environment through, for example, physical movement, and/or manipulation of one or more electronic devices.

SUMMARY

In one aspect, displaying, in a head mounted display (HMD) device operating in a physical environment, a virtual environment from a first virtual perspective corresponding to a first virtual position; detecting a selection of a second virtual position; defining a three-dimensional (3D) virtual proxy surface based on the first virtual position and the second virtual position; detecting a movement command; moving virtual features of the virtual environment along the 3D virtual proxy surface in response to the detected movement command; and displaying the virtual environment from a second virtual perspective based corresponding to the second virtual position.

In another aspect, computer program product may be embodied on a non-transitory computer readable medium. The computer readable medium may have stored thereon a sequence of instructions which, when executed by a processor, causes the processor to execute a method. The method may include displaying, in a head mounted display (HMD) device operating in a physical environment, a virtual environment from a first virtual perspective, the first virtual perspective corresponding to a first virtual position; detecting a selection of a second virtual position; defining a three-dimensional (3D) virtual proxy surface based on the first virtual position and the second virtual position; detecting a movement command; moving virtual features of the virtual environment along the 3D virtual proxy surface in response to the detected movement command; and displaying the virtual environment from a second virtual perspective corresponding to the second virtual position.

The details of one or more implementations are set forth in the accompanying drawings and the description below. Other features will be apparent from the description and drawings, and from the claims.

BRIEF DESCRIPTION OF THE DRAWINGS

FIGS. 4A-4E, 5A-5C, 6A-6E and 7A-7C are third person views illustrating movement of virtual features of an augmented and/or virtual reality environment, in accordance with implementations as described herein.

DETAILED DESCRIPTION

A user immersed in an augmented reality and/or a virtual reality environment wearing, for example, a head mounted display (HMD) device may explore the virtual environment and interact with virtual objects, features and the like in the virtual environment through various different types of inputs. These inputs may include, for example, physical interaction including, for example, physical movement and/or manipulation or the HMD and/or of an electronic device separate from the HMD, and/or hand/arm gestures, head movement and/or head and/or eye directional gaze and the like. A user may implement one or more of these different types of interactions to execute a particular action in the virtual environment. For example, a user may execute a particular action to virtually move through the virtual environment, for example, from a first area of the virtual environment to a second area of the virtual environment, or from a first virtual environment to a second virtual environment. This movement through the virtual environment, or from one virtual environment to another may include moving features of the virtual environment relative to the user, while the user remains relatively stationary, to generate a perception of moving through the virtual environment.

A system and method, in accordance with implementations described herein, may allow the user to move virtual features of the virtual environment in response to user inputs which feel relatively natural to the user based on the particular virtual environment and associated virtual features. This movement of the virtual features of the virtual environment may cause a perceived change in the user's position or location within the virtual environment. A system and method, in accordance with implementations described herein, may display the virtual environment to the user for example, on a display of an HMD worn by the user. A system and method, in accordance with implementations described herein, may receive user inputs for moving the virtual environment relative to the user, for example, via movement and/or other manipulation of a handheld electronic device operably coupled with the HMD. This movement of the virtual environment may cause a perceived change in position of the user in the virtual environment, while the user remains relatively stationary in the ambient environment in which the system operates. In this manner, the user may virtually move, or travel, from a first position within the virtual environment, to a second position within the virtual environment, in response to an input generated by a relatively natural user movement of the handheld electronic device.

Figure 1:
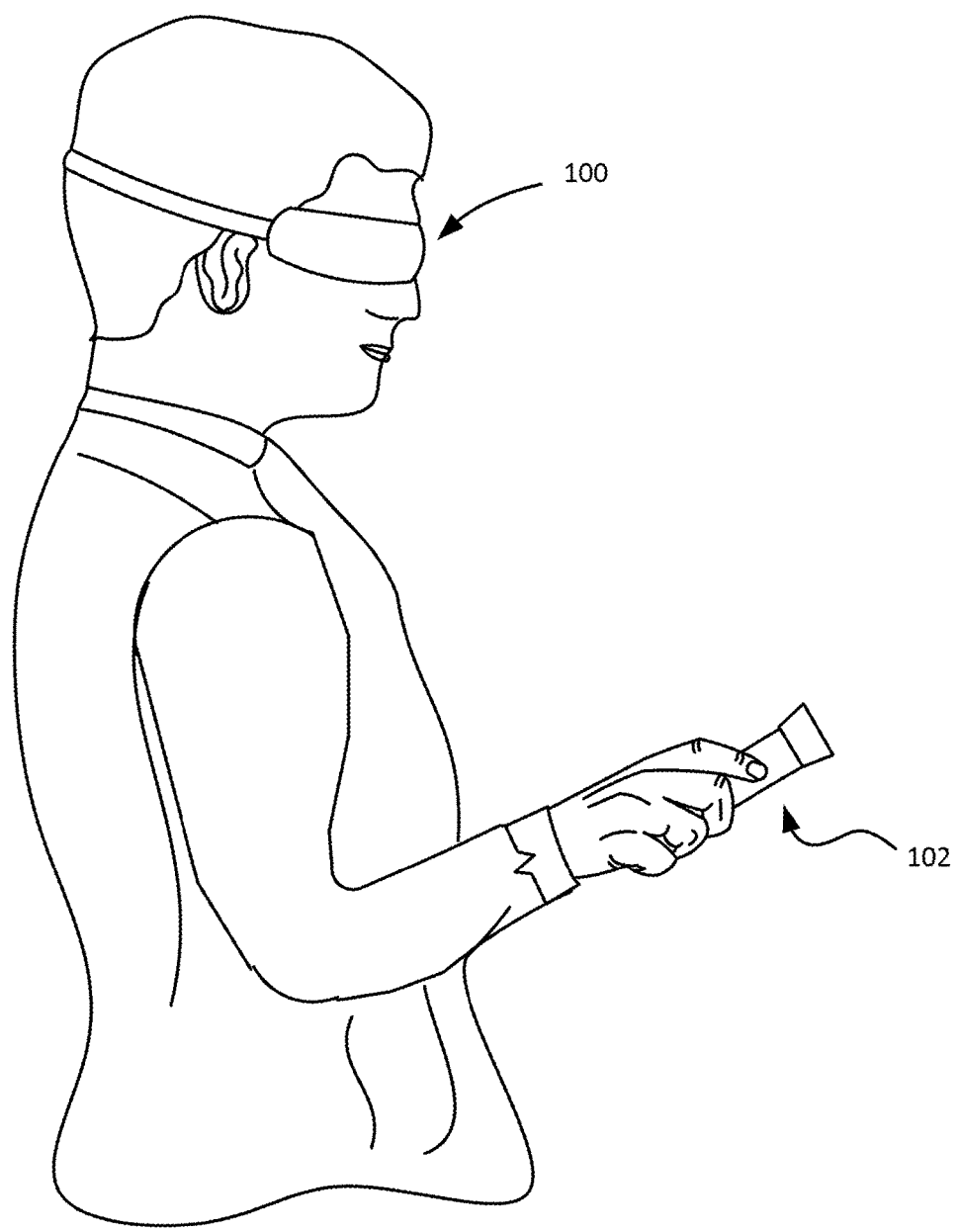
FIG. 1 is an example implementation of an augmented reality and/or a virtual reality system including a head mounted display device and one or more handheld electronic devices, in accordance with implementations as described herein.

In the example implementation shown in FIG. 1, a user wearing an HMD 100 is holding a portable handheld electronic device 102. The handheld electronic device 102 may be, for example, a controller, a smartphone, a joystick, or another portable handheld electronic device that may be paired with, and communicate with, the HMD 100 for interaction in the virtual environment generated by the HMD 100 and displayed to the user, for example, on a display of the HMD 100. The handheld electronic device 102 may be operably coupled with, or paired with the HMD 100 via, for example, a wired connection, or a wireless connection such as, for example, a WiFi or Bluetooth connection. This pairing, or operable coupling, of the handheld electronic device 102 and the HMD 100 may provide for communication between the handheld electronic device 102 and the HMD 100 and the exchange of data between the handheld electronic device 102 and the HMD 100. This may allow the handheld electronic device 102 to function as a controller in communication with the HMD 100 for interacting in the immersive virtual environment generated by the HMD 100. For example, a manipulation of the handheld electronic device 102, and/or an input received on a touch surface of the handheld electronic device 102, and/or or a movement of the handheld electronic device 102, may be translated into a corresponding selection, or movement, or other type of interaction, in the virtual environment generated and displayed by the HMD 100.

The example implementation shown in FIG. 1 includes one handheld electronic device 102 in communication with the HMD 100, for data exchange with the HMD 100, and interaction with virtual features, elements, objects and the like in the virtual environment generated by the HMD 100. However, in some implementations, more than one handheld electronic device 102, and/or other external computing device(s), may be operably coupled with, and in communication with, the HMD 100, and may operate together, or separately, for interaction in the virtual environment.

Figure 2A:
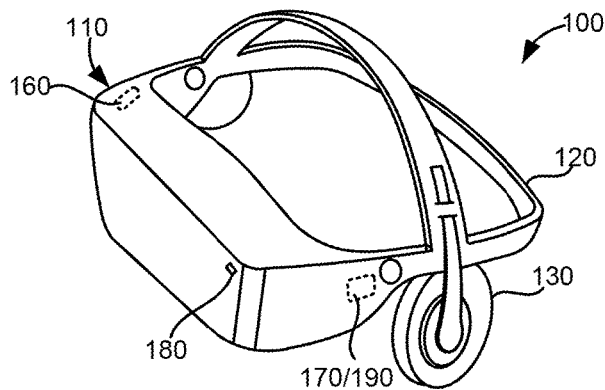
FIGS. 2A and 2B are perspective views of an example head mounted display device.
Figure 2B:
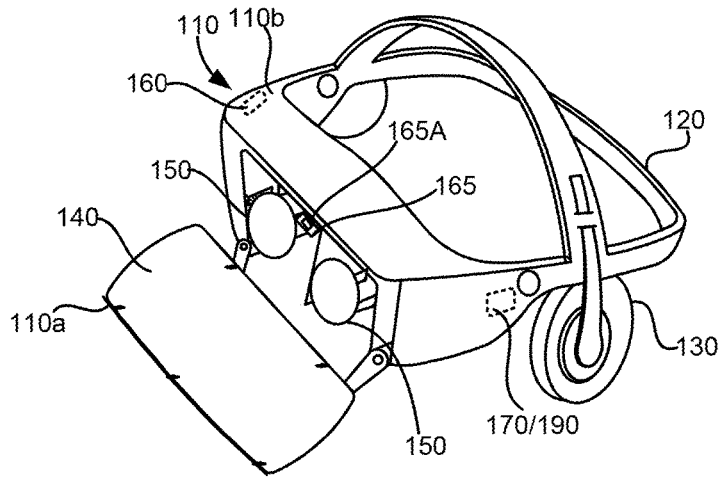
Figure 2C:
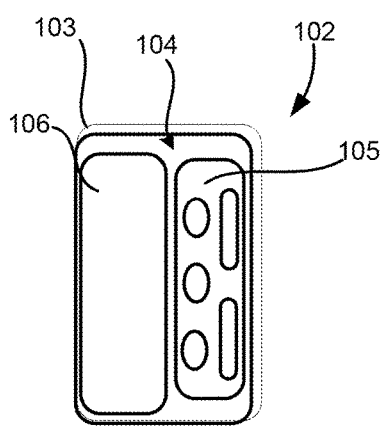
FIG. 2C illustrates an example handheld electronic device, in accordance with implementations as described herein.

FIGS. 2A and 2B are perspective views of an example HMD, such as, for example, the HMD 100 worn by the user in FIG. 1, and FIG. 2C illustrates an example handheld electronic device such as, for example, the handheld electronic device 102 shown in FIG. 1.

The handheld electronic device 102 may include a housing 103 in which internal components of the device 102 are received. A user interface 104 may be provided on the housing 103, accessible to the user. The user interface 104 may include, for example, a touch sensitive surface 106 configured to receive user touch inputs, touch and drag inputs, and the like. The user interface 104 may also include user manipulation devices 105 such as, for example, actuation triggers, buttons, knobs, toggle switches, joysticks and the like.

The HMD 100 may include a housing 110 coupled to a frame 120, with an audio output device 130 including, for example, speakers mounted in headphones, also coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. The HMD 100 may include a sensing system 160 including various sensors and a control system 170 including a processor 190 and various control system devices to facilitate operation of the HMD 100.

For example, in some implementations, the sensing system 160 may include an inertial measurement unit (IMU) 162 including various different types of sensors such as, for example, an accelerometer, a gyroscope, a magnetometer, and other such sensors. A position and orientation of the HMD 100 may be detected and tracked based on data provided by the sensors included in the IMU 162. The detected position and orientation of the HMD 100 may allow the system to, in turn, detect and track the user's head gaze direction, and head gaze movement, and other information related to the position and orientation of the HMD 100.

In some implementations, the HMD 100 may include a gaze tracking device 165 including, for example, one or more sensors 165A, to detect and track eye gaze direction and movement. Images captured by the sensor(s) 165A may be processed to detect and track direction and movement of the user's eye gaze. The detected and tracked eye gaze may be processed as a user input to be translated into a corresponding interaction in the immersive virtual experience. A camera 180 may capture still and/or moving images that may be used to help track a physical position of the user and/or other external devices in communication with/operably coupled with the HMD 100. The captured images may also be displayed to the user on the display 140 in a pass through mode.

Figure 3:
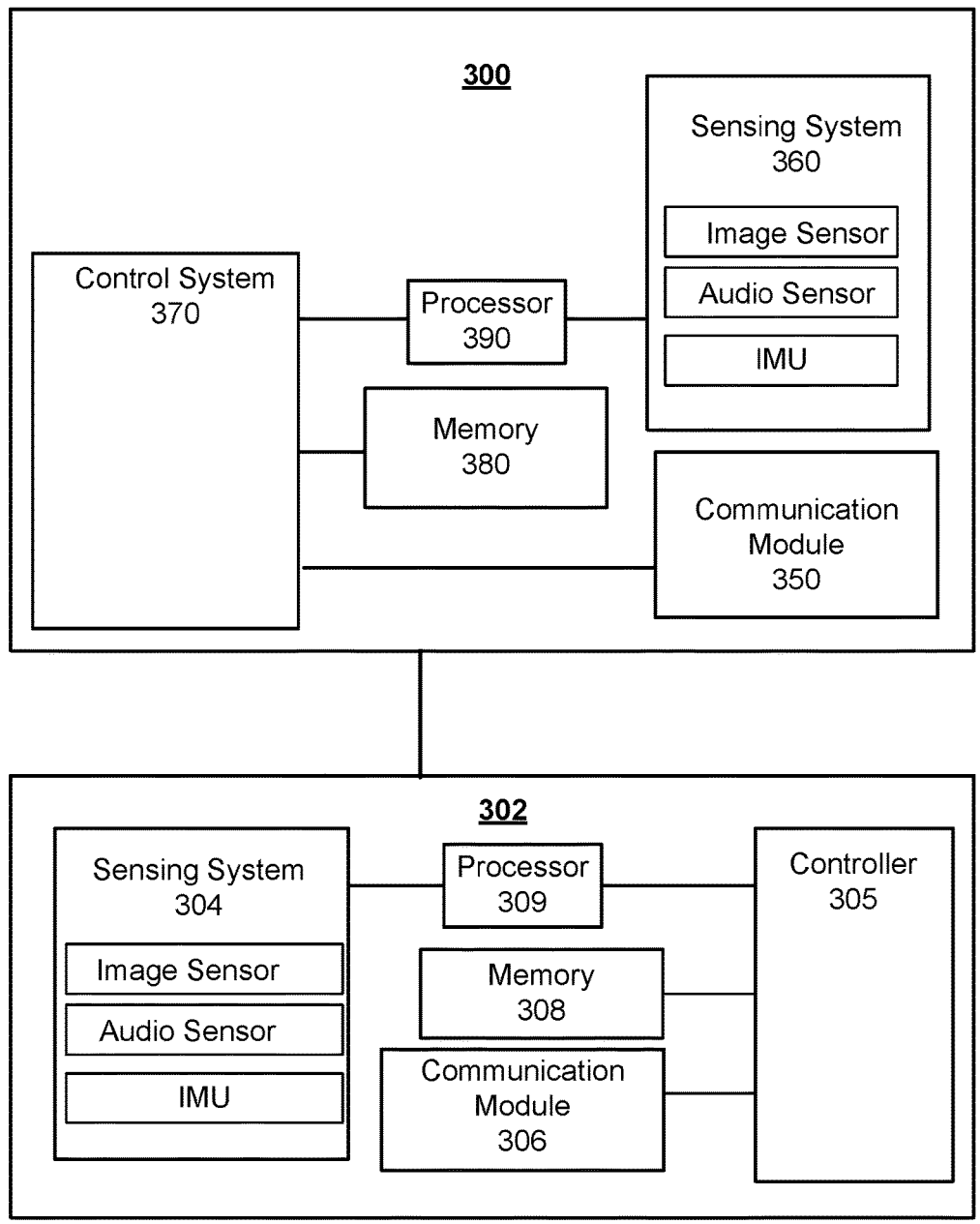
FIG. 3 is a block diagram of an example augmented and/or virtual reality system, in accordance with implementations as described herein.

A block diagram of a system providing for moving the virtual elements of the virtual environment relative to the user is shown in FIG. 3. The system may include a first electronic device 300 (such as, for example, an HMD as described above with respect to FIGS. 1 and 2A-2B), and at least one second electronic device 302 (such as, for example, a handheld electronic device as described above with respect to FIGS. 1 and 2C) in communication with the first electronic device 300.

The first electronic device 300 may include a sensing system 360 and a control system 370, which may be similar to the sensing system 160 and the control system 170, respectively, shown in FIGS. 2A and 2B. The sensing system 360 may include different types of sensors, including, for example, a light sensor, an audio sensor, an image sensor, a distance and/or proximity sensor, an IMU including, for example, a gyroscope, an accelerometer, a magnetometer and the like, a timer, and/or other sensors and/or different combination(s) of sensors. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a memory 380, and a processor 390 in communication with the sensing system 360 and the control system 370. The processor 390 may process inputs received from the sensing system 360, as well as from other external sources such as, for example, the second electronic device 302, and execute instructions corresponding to the detected inputs. The first electronic device 300 may also include a communication module 350 providing for communication between the first electronic device 300 and other, external computing devices, such as, for example, the second electronic device 302 and other computing devices involved in handling system related information.

The second electronic device 302 may include a communication module 306 providing for communication and data exchange between the second electronic device 302 and another device, such as, for example, the first electronic device 300. In some implementations, depending on a particular configuration of the second electronic device 302 (i.e., a handheld electronic device or controller, versus a keyboard or a mouse), the second electronic device 302 may include a sensing system 304 including, for example, an image sensor and an audio sensor, such as is included in, for example, a camera and microphone, an IMU, a timer, a touch sensor such as is included in a touch sensitive surface of a handheld electronic device, or smartphone, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

Example implementations of virtual reality systems are shown in FIGS. 4A-4E, 5A-5C, 6A-6E and 7A-7C. In these example implementations, virtual elements of the virtual environment may be moved with respect to the user, resulting in a perceived movement and change in the user's virtual location in the virtual environment. FIGS. 4A-4E and 6A-6E illustrate third person views of the user in a physical space 400, wearing the HMD 100 and interacting with elements of the virtual environment using the handheld electronic device 102. As described above, the virtual environment may be displayed to the user within the HMD 100, for example, on the display 140 of the HMD 100, and thus the virtual environment would not be visible outside of the HMD 100. However, simply for ease of discussion and illustration, a representation of the virtual elements of the virtual environment 500 is illustrated outside of the HMD 100 in FIGS. 4A-4E and 6A-6E, as they would be viewed and experienced by the user.

Figure 4A:
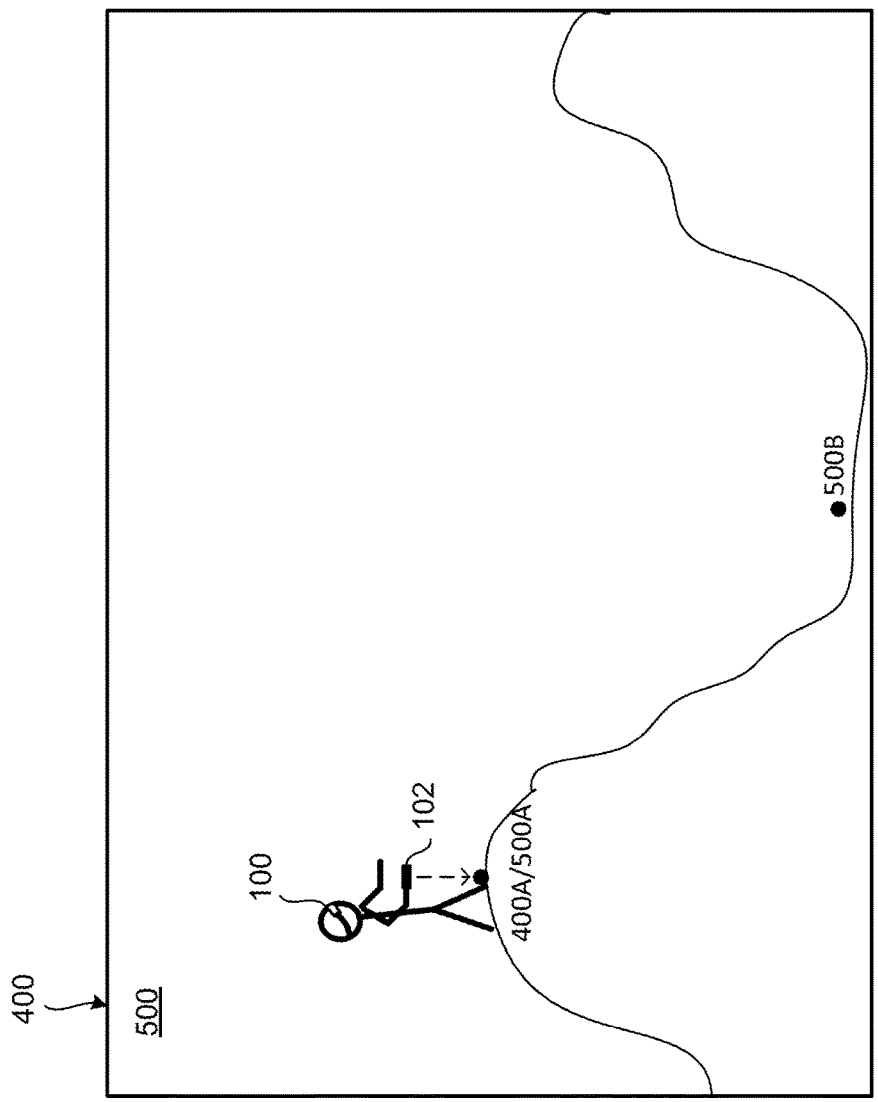

As shown in FIG. 4A, the user may view the virtual environment 500, for example on the display 140 of the HMD 100. In the example shown in FIG. 4A, virtual elements of the virtual environment 500 are illustrated outside of the HMD 100, for ease of discussion and illustration. The user may be located at a first virtual position 500A in the virtual environment 500, corresponding to a physical position 400A in the physical space 400. In some implementations, the physical position 400A may be established based on, for example, a position of the user on the physical floor in the physical space 400, below the handheld electronic device 102, In some implementation, the first virtual position 500A may be established based on, for example, a position on the virtual ground in the virtual environment 500, below the handheld electronic device 102. From the first virtual position 500A, the user may choose to move or drag a virtual feature or element at a second virtual position 500B in the virtual environment 500. This moving or dragging of virtual features may generate the perception, to the user, that the user is moving in the virtual environment 500, when in actuality, the user remains stationary in the physical environment 400, and the virtual features of the virtual environment 500 are moving relative to the user's stationary position at the position 400A. The virtual features of the virtual environment 500 may be moved in a variety of different directions relative to the user, such as, for example, around the user, or towards the user, or away from the user, in response to a change in orientation of the user and/or movement of the handheld electronic device 102 held by the user. This movement may cause corresponding movement of the elements of the virtual environment 500 relative to the user, without the user physically changing position the in physical space 400.

Figure 4B:
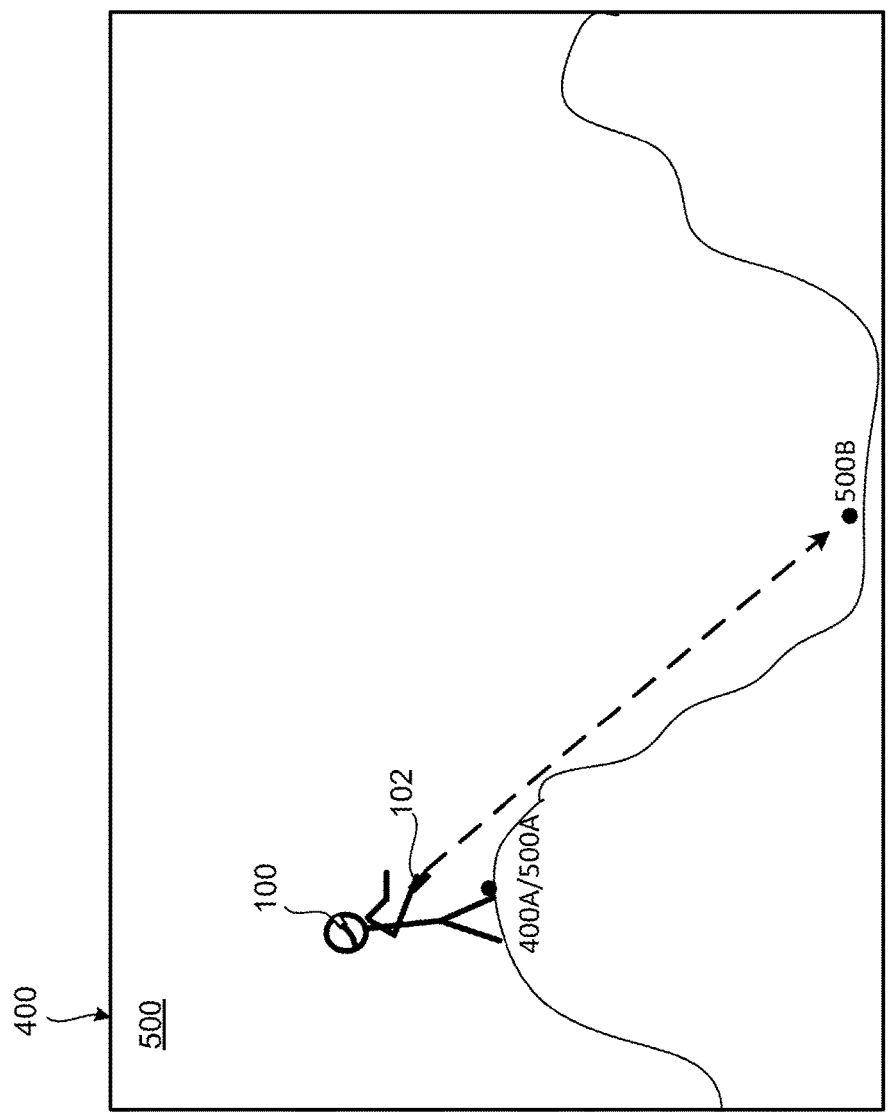
Figure 4E:
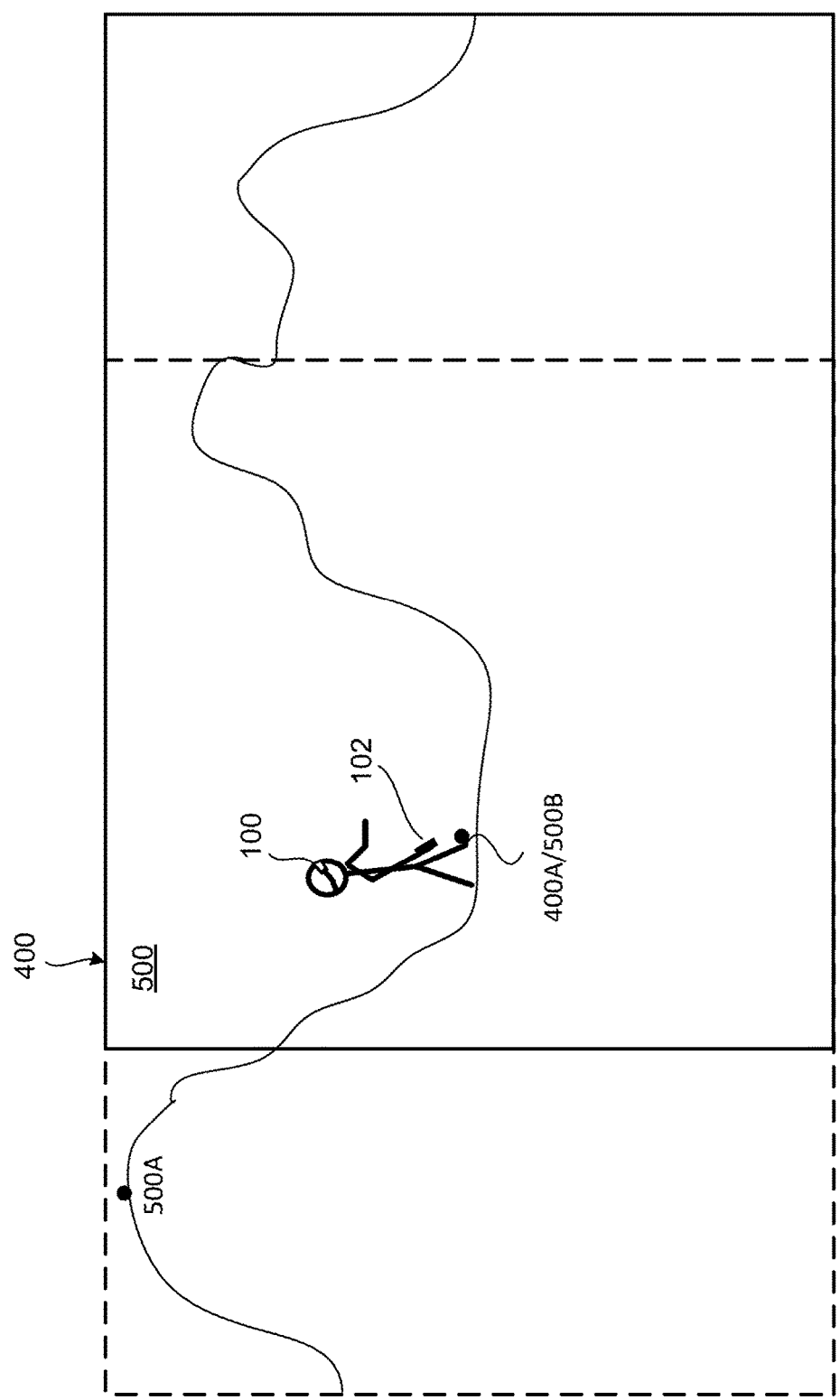

In some implementations, the user may direct the handheld electronic device 102 toward the virtual feature at the second virtual position 500B to select, or identify the virtual feature at the second virtual position 500B. For example, in some implementations, from the first physical position 400A/first virtual position 500A, the user may direct a virtual beam or ray, extending from the handheld electronic device 102 toward the virtual feature at the second virtual position 500B, as shown in FIG. 4B. In some implementations, the user may actuate one of the manipulation devices 105 of the handheld electronic device 102 to indicate selection of the virtual feature at the second virtual position 500B. For example, the user may actuate or depress a trigger or a button on the handheld electronic device 102, and/or may actuate another of the manipulation devices 105 of the handheld electronic device 102, to confirm selection of the virtual feature at the second virtual position 500B. The second virtual position 500B may be detected based on, for example, a portion of the virtual beam or ray detected within a set proximity of the virtual feature at the second virtual position 500B in the virtual environment 500. The second virtual position 500B may be detected based on, for example, an intersection of a portion of the virtual beam or ray with the virtual feature at the second virtual position 500B, and the like.

In response to detection of the user's selection of the second virtual position 500B, the system may construct a proxy surface 550. The proxy surface 550 may guide the movement of the virtual features of the virtual environment 500 relative to the user, and/or the user's perceived movement from the first virtual position 500A to the second virtual position 500B. In the example shown in FIG. 4C, the proxy surface 550 is a complex proxy surface 550 defined by a right circular three-dimensional cone. The apex 550A of the three-dimensional cone defining the complex proxy surface 550 may be on the physical floor of the physical space 400, corresponding to a portion of the physical floor below the handheld electronic device 102, and essentially at the user's feet on the physical floor of the physical space 400. The surface of the cone defining the proxy surface 550 may extend from the apex 550A to the selected second virtual position 500B, with the base 550B of the three-dimensional cone intersecting the selected second virtual position 500B. A sphere 550C that intersects the base 550B of the three-dimensional cone defining the proxy surface 550 may extend outward from the base 550B. The system may use this complex proxy surface 550 to guide the movement of the virtual features relative to the user. This may allow the user to experience a perceived virtual movement from the first virtual position 500A to the second virtual position 500B, while remaining essentially at the first physical position 400A in the physical space 400. For example, in the example shown in FIGS. 4A-4E, the user may experience what is perceived as movement along the terrain, between the first virtual position 500A and the second virtual position 500B, while remaining essentially at the physical position 400A.

Figure 5A:
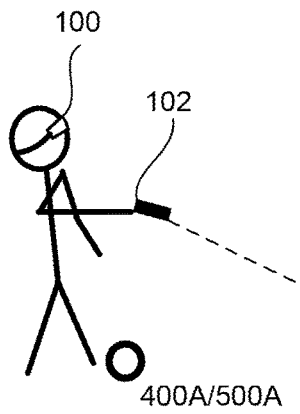
Figure 5B:
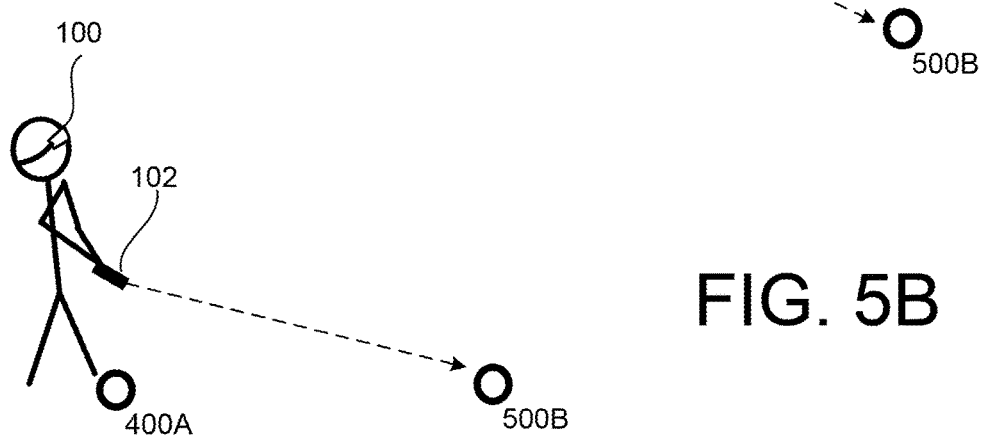
Figure 5C:
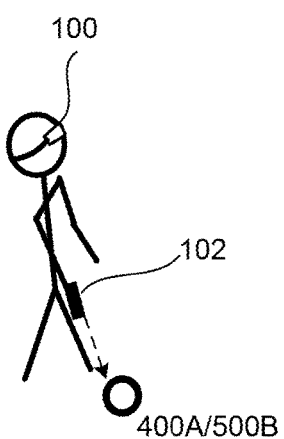

In the example arrangement shown in FIG. 4C, the user is pointing and dragging a virtual feature at the second virtual position 500B that is below the user at the first virtual position 500A. This may result in the proxy surface 550 being defined by a sphere 550C with the cone on top, with the user positioned (at the first virtual position 500A) at the apex 500A of the cone defining the proxy surface 550. The user may drag the virtual feature at the second virtual position 500B closer to the user by, for example, drawing the user's arm/hand holding the handheld electronic device 102 closer to the user's body, for example, as illustrated in the change in position from FIG. 5A to FIG. 5B. This movement may cause the features of the virtual environment 500 to move relative to the user. For example, this movement may cause the virtual feature at the second virtual position 500B to move toward the user, until the virtual features of the virtual environment 500 are oriented such that the user is at the second virtual location 500B, as shown in FIG. 5C. The user may perceive this as movement in the virtual environment 500, even though the user may remain at essentially the same physical position 400A in the physical space 400, as shown in FIG. 4D.

As the user drags the virtual environment 500, for example, through movement of the handheld electronic device 102, as described above, and for example, with the manipulation device 105 still in the actuated state, the virtual environment 500 may move along the complex proxy surface 550 relative to the user. If, while dragging the virtual environment 500 in this manner, the user's position corresponds, or intersects with, with a portion of the proxy sphere 550C, the virtual environment 550 may move substantially horizontally. However, if the user's position corresponds, or intersects with, a portion of the proxy cone, the virtual environment 500 may move both horizontally and vertically. For example, if the user were to direct the handheld electronic device 102 downward, as shown in FIGS. 4C and 4D, this movement may cause movement of the features of the virtual environment 500 in both the horizontal and vertical directions. In the example shown in FIGS. 4C and 4D, this movement draws the user forward, into a valley, and also down, into the valley, until the user arrives at the selected second virtual position 500B and actuation of the manipulation device 105 is released.

As shown in FIGS. 4A-4E, the user remains essentially in the same physical position 400A in the physical space 400, while the features at different virtual positions (for example, the virtual positions 500A and 500B) move with respect to the user. This movement of the virtual features with respect to the user may be accomplished as the user draws the handheld electronic device 102 closer, and in a downward direction, so that the user's feet remain grounded on the virtual ground, to drag the virtual environment 500 in the desired direction.

In the example shown in FIGS. 4A-4E, the user drags the virtual environment 500 along the complex proxy surface 550 so that the features of the virtual environment 500 move relative to the user, with the selected second virtual position 500B being dragged to a position essentially at or under the user's feet. However, the proxy surface 550 may guide the movement of the virtual features of the virtual environment 500 in other directions, in response to other movements of the handheld electronic device 102, a reorientation of the user, and the like. For example, the user may implement a lateral, or transverse, movement of the handheld electronic device 102 (and/or the user may pivot, but otherwise remain essentially in place at the physical position 400A, effectively causing a lateral movement of the handheld electronic device 102). This may result in a corresponding lateral movement of the features of the virtual environment 500, that movement being guided by a corresponding portion of the proxy surface 550. Similarly, an upward movement of the handheld electronic device 102 (rather than the downward movement discussed above with respect to FIGS. 4A-4E) may result in a corresponding movement of the features of the virtual environment 500, that movement being guided by a corresponding portion of the proxy surface 550.

Figure 6A:
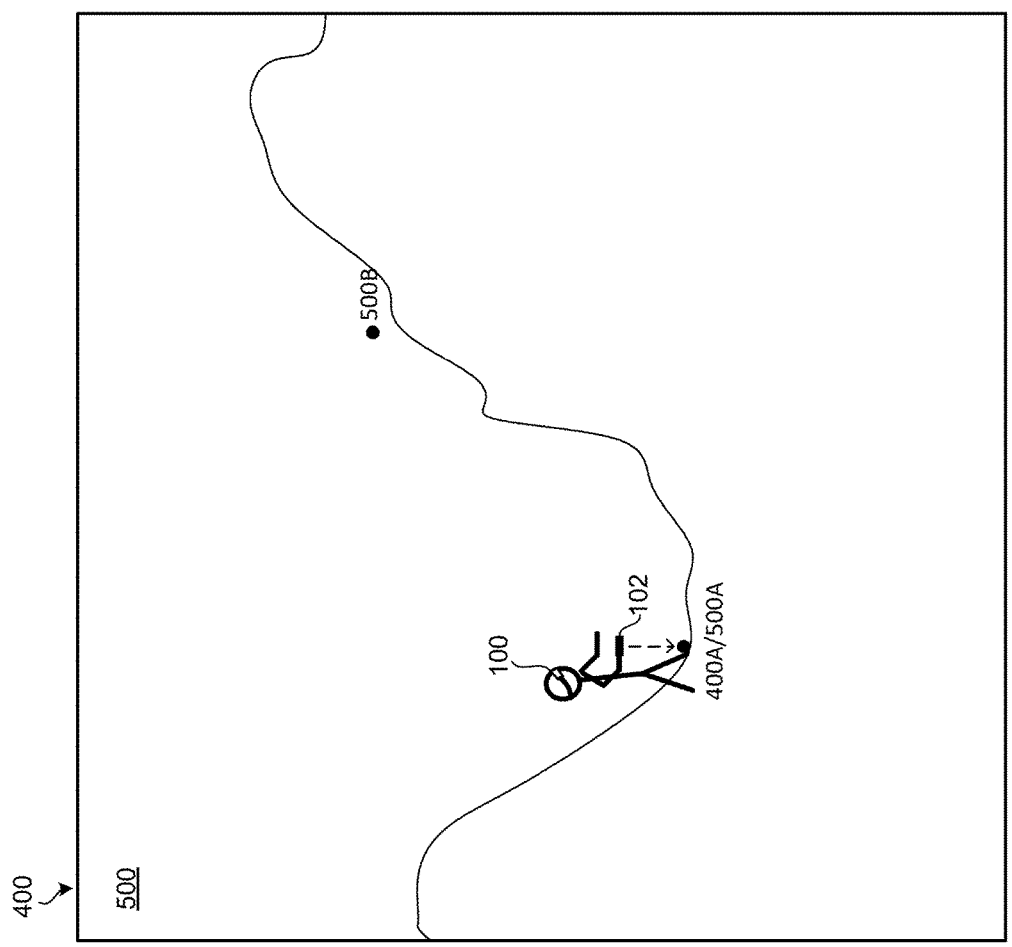

Another example is shown in FIGS. 6A-6E. In FIG. 6A, the user is located at a first virtual position 500A in the virtual environment 500, corresponding to a physical position 400A in the physical space 400. As noted above, the position(s) 400A/500A may be established based on, for example, a position on the physical floor in the physical space 400/a position on the virtual ground in the virtual environment 500 below the handheld electronic device 102. From the first virtual position 500A, the user may choose to move to a second virtual position 500B. As noted above, this may involve moving, or dragging, virtual features at the second virtual position 500B to, or towards, the user. This may, effectively, move the elements of the virtual environment 500 relative to the user, without the user necessarily physically moving or changing position in the physical space 400.

Figure 6B:
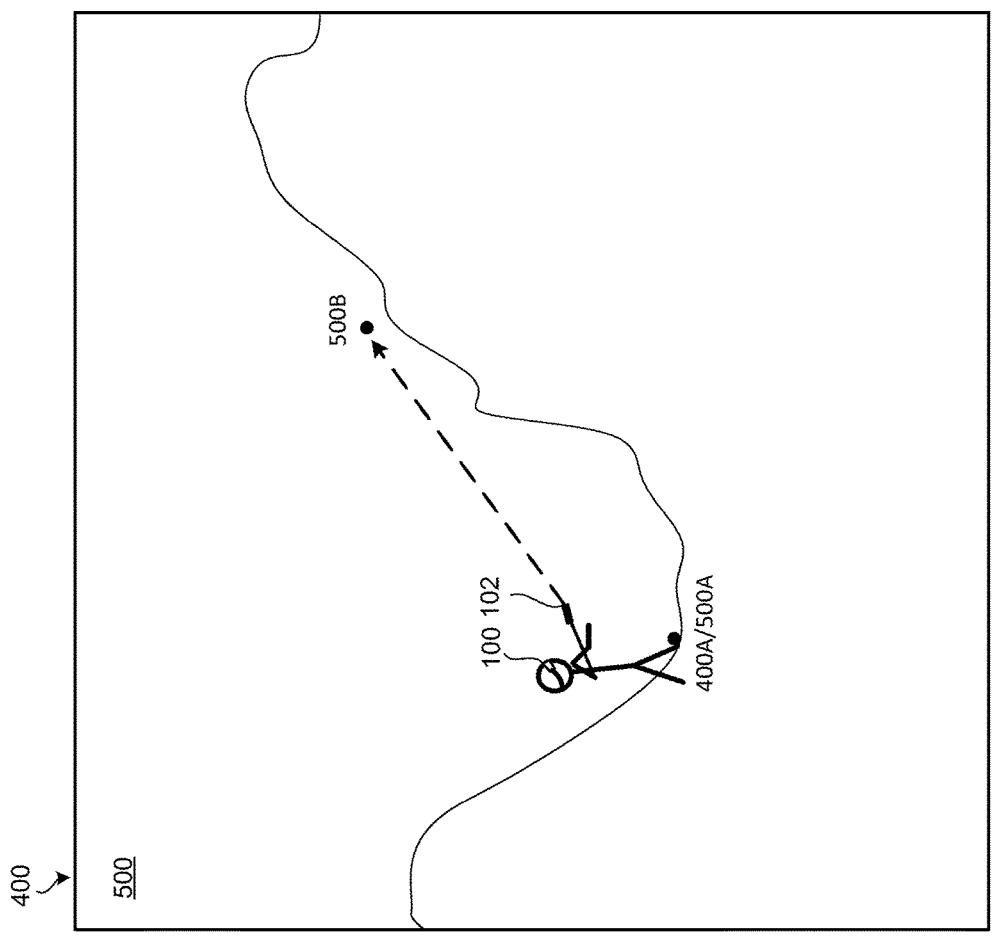

As noted above, the user may manipulate the handheld electronic device 102 to select, or identify virtual features at the second virtual position 500B. This may be accomplished by, for example, directing a virtual beam or ray, extending from the handheld electronic device 102 toward the second virtual position 500B, as shown in FIG. 6B and, for example, actuating one of the manipulation devices 105 of the handheld electronic device 102 to indicate selection of a virtual feature at the second virtual position 500B. In response to detection of the user's selection of the virtual feature at the second virtual position 500B as described above, the system may construct the complex proxy surface 550 as described above. The complex proxy surface 550 may guide the movement of the virtual features of the virtual environment 500 relative to the user, and/or the user's perceived movement from the first virtual position 500A to the second virtual position 500B.

In the example shown in FIG. 6C, the proxy surface 550 is defined by a right circular three-dimensional cone, with the apex 550A corresponding to a portion of the physical floor below the handheld electronic device 102, essentially at the user's feet. The surface of the three dimensional cone may extend from the apex 550A to the selected second virtual position 500B. The base 550B of the three-dimensional cone may intersect the selected second virtual position 500B, and the sphere 550C may extend outward from the base 550B. As described above, this complex proxy surface 550 may guide the movement of the virtual features relative to the user, so that the user may experience a perceived virtual movement from the first virtual position 500A to the second virtual position 500B, while remaining essentially stationary at the first physical position 400A in the physical space 400.

Figure 6C:
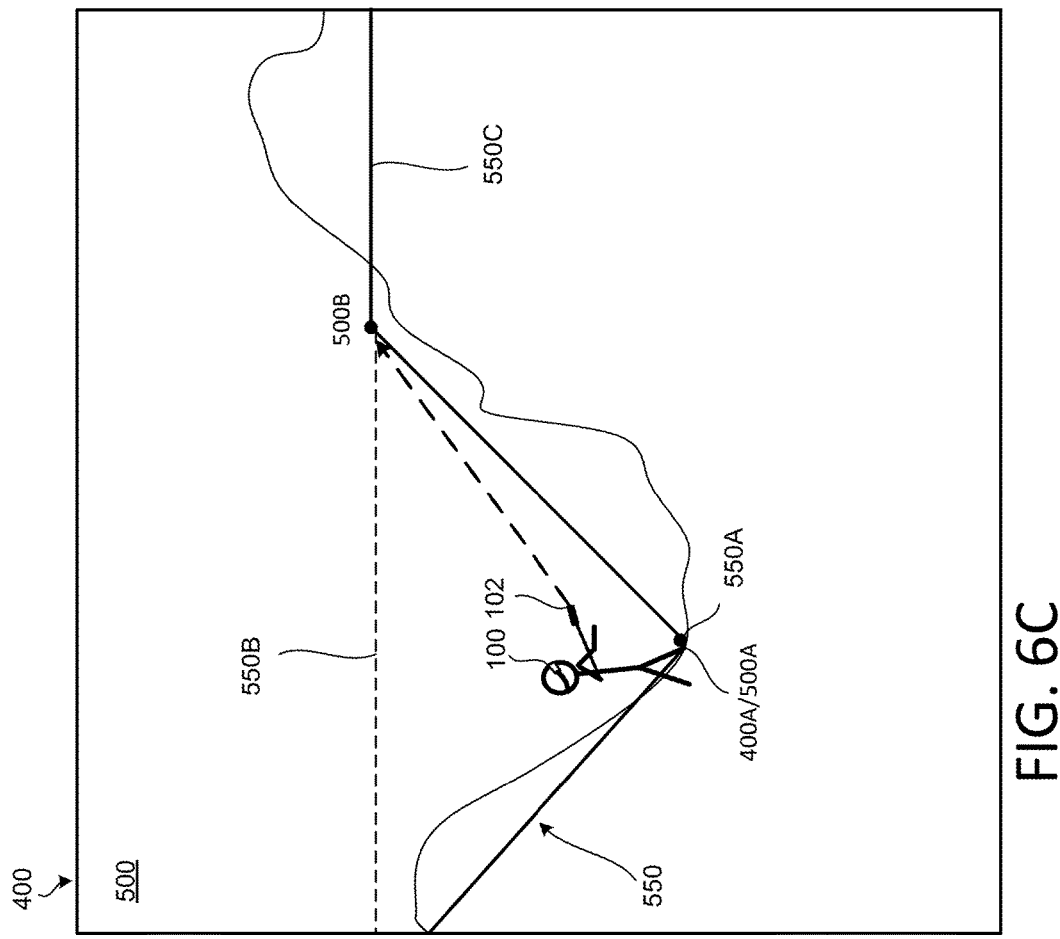
Figure 6D:
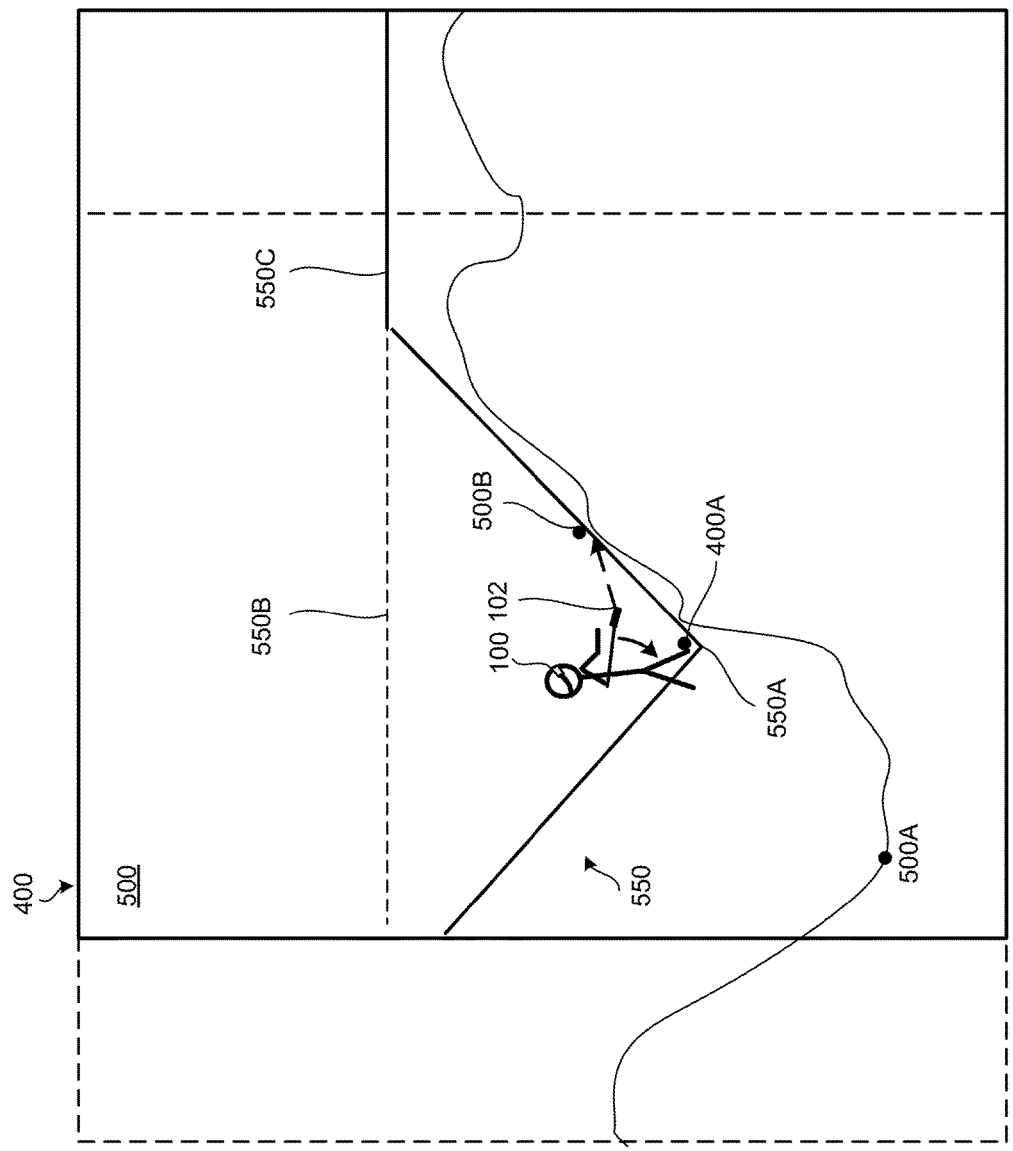
Figure 7A:
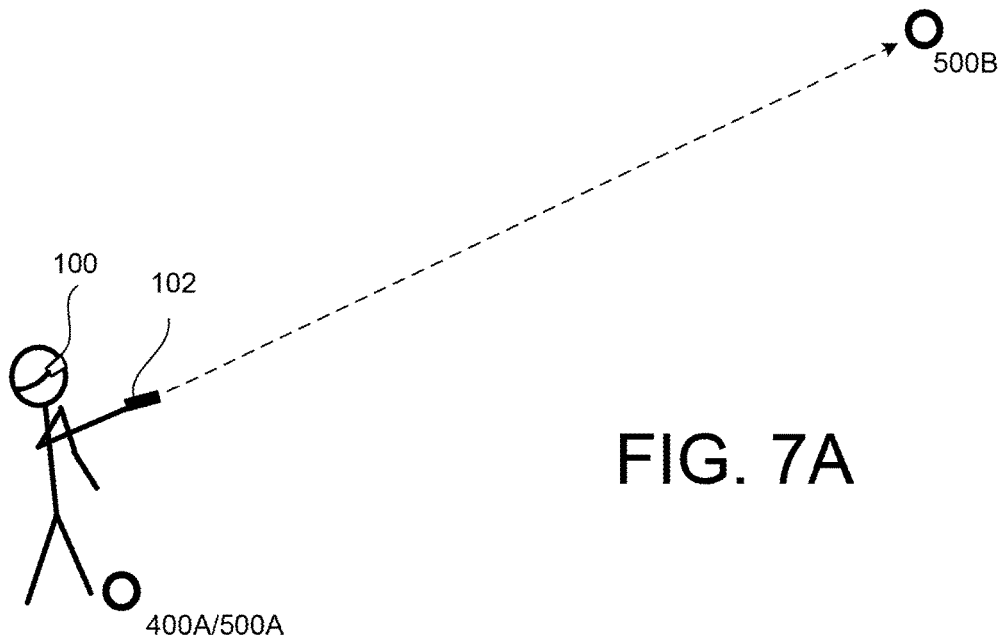
Figure 7B:
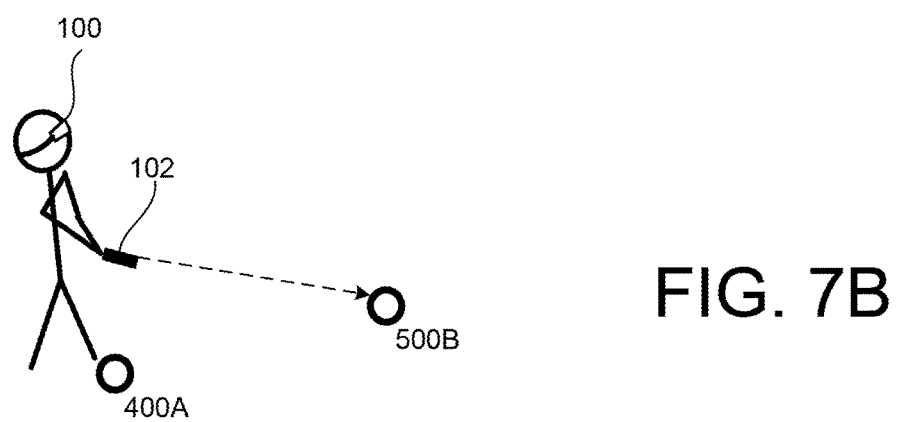
Figure 7C:
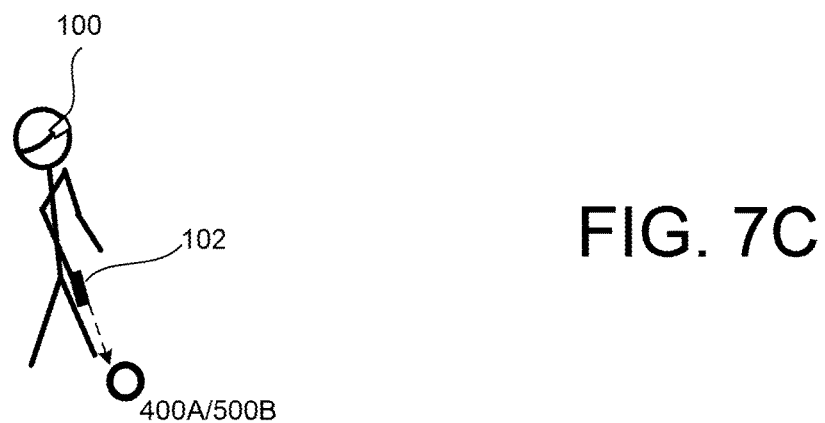

In the example arrangement shown in FIG. 6C, the user is pointing and dragging a virtual feature at the second virtual position 500B that is above the user at the first virtual position 500A. This may result in the complex proxy surface 550 being defined by a sphere 550C with a three-dimensional conical divot on top. In this arrangement, the user is standing in the bottom of the three-dimensional conical divot, i.e., at the base of the cone, with the virtual beam or ray directed from the handheld electronic device 102 contacting or intersecting the rim of the conical divot, at a position corresponding to the second virtual position 500B. The user may drag the virtual feature at the second virtual position 500B closer by, for example, drawing the user's arm/hand holding the handheld electronic device 102 closer to the user's body, as illustrated by the change in position shown from FIG. 7A to FIG. 7B. This may cause the features of the virtual environment 500 to move relative to the user, and for example, may drag the virtual feature at the second virtual position 500B to the user, as shown in FIG. 7C. The user may perceive this as movement in the virtual environment 500, even though the user may remain at essentially stationary the same physical position 400A in the physical space 400, as shown in FIG. 6D. This may result in the complex proxy surface 550 being defined by an extension of the virtual connection between the first virtual position 500A and the second virtual position 500B defining a first 3D portion of the 3D virtual proxy surface 500, and a second 3D portion of the 3D virtual proxy surface extending from the first 3D portion of the virtual proxy surface 500.

As the user drags the virtual environment 500, for example, through movement of the handheld electronic device 102, as described above, and for example, with the manipulation device 105 still in the actuated state, the virtual environment 500 may move along the complex proxy surface 550 relative to the user. For example, if the user were to direct the handheld electronic device 102 downward, as shown in FIGS. 6C and 6D, this movement may cause movement of the features of the virtual environment 500 in both the horizontal and vertical directions. This movement may appear to draw the user forward, and upward, onto a plateau at the selected second virtual position 500B with release actuation of the manipulation device 105.

As shown in FIGS. 6A-6E, the user remains essentially in the same physical position 400A in the physical space 400, while the virtual features of the virtual environment 500 move with respect to the user as the user draws the handheld electronic device 102 closer, and in a downward direction, so that the user's feet remain grounded on the virtual ground, to drag the virtual environment 500 in the desired direction.

In the examples shown in FIGS. 4A-4E and 6A-6E, the user, at the first physical position 400A and the corresponding first virtual position 500A, directs a virtual beam or ray to a selected virtual feature at a second virtual position 500B. The user may select this virtual feature at the second virtual position 500B by, for example, actuation of a manipulation device 105 of the handheld electronic device 102. The virtual features of the virtual environment 500 may be moved or dragged relative to the user in response to movement of the handheld electronic device 102, while the user remains substantially stationary in the physical space 400. In this manner, the user may experience a perceived movement from the first virtual position 500A to the second virtual position 500B, for example, a perceived movement along the example terrain shown in FIGS. 4A-4E and 6A-6E, that perceived movement being guided by the complex proxy surface 550. The terrain shown in FIGS. 4A-4E and 6A-6E is just one example of features in the virtual environment 500 which may be moved in this manner relative to the user. Other features, in other virtual environments, may be selected and moved in the manner described above.

In the examples shown in FIGS. 4A-4E and 6A-6E, the user may direct the virtual beam or ray from the handheld electronic device 102 toward the second virtual position 500B. With the second virtual position 500B selected, the user may draw the handheld electronic device 102 in a direction toward the user, and downward, so that as the handheld electronic device 102 is brought to a position in which it is oriented in a downward direction, for example, toward a portion of the physical floor in the vicinity of the user's feet. This movement and orientation may indicate that the user wishes to position his feet at the selected second virtual position 500B, and may cause corresponding movement or dragging of the virtual environment 500, and the virtual features of the virtual environment 500, so that the user perceives he has moved to the second virtual position 500B, while he has remained in the same physical position 400A in the physical space 400. This may allow the user to move from the first virtual position 500A to the second virtual position 500B, while experiencing the virtual features between the first virtual position 500A and the second virtual position 500B, without any substantial change in his physical position. In this movement of the virtual environment 500, and perceived movement of the user from the first virtual position 500A to the second virtual position 500B, the user may, for example, move along the terrain included in the examples shown in FIGS. 4A-4E and 6A-6E.

Movement of the virtual features of the virtual environment 500 along the contour defined by the complex proxy surface 500 may allow the user to experience this movement as a relatively smooth movement, rather than the jarring movement which would be experienced were the visual display of the virtual environment 500 to follow the displayed virtual terrain during movement. This relatively smooth movement experienced by the user may reduce effects which may otherwise lead to motion sickness and disorientation during this type of movement of the virtual environment 500.

In some implementations, the speed and/or the direction of the movement of the handheld electronic device 102 may correspond to the speed and/or the direction of the movement of the virtual elements of the virtual environment 500 when moving the user from the first virtual position 500A to the second virtual position 500B. For example, in some implementations, the speed of the user's movement of the handheld electronic device 102 may be proportional to the speed of the movement of the virtual elements of the virtual environment 500, and the perceived speed of the user's movement from the first virtual position 500A to the second virtual position 500B.

In some implementations, the use of a three dimensional, complex proxy surface 550 may allow the user to remain connected in the virtual environment 500, even in the event that a movement outside of the inward and downward movement described above is detected. For example, in the event that a lateral movement of the handheld electronic device 102 is detected, the system may detect a corresponding lateral shift in the user's desired focus or movement direction. Because this lateral shift is likely detected along the conical portion of the complex proxy surface 550, the movement of the virtual features of the virtual environment 500 may continue to follow a relatively smooth movement path, even in the event of a lateral movement of the handheld electronic device 102.

The example complex proxy surface 550 described above with respect to FIGS. 4A-4E and 6A-6E includes a conical portion and a spherical portion extending outward from the base perimeter of the conical portion, to facilitate explanation and illustration of these concepts. However, the complex proxy surface may be defined by another surface, and/or arrangement of surfaces, that intersect the physical ground, at a portion of the physical ground below the handheld electronic device, and that intersect the virtual environment at a portion of the virtual beam intersecting the virtual feature at the second virtual location in the virtual environment.

In some implementations, an incidence angle between the handheld electronic device 102 (for example, the virtual beam or ray directed from the handheld electronic device 102) and the proxy surface may be limited so that, in a situation in which the orientation of the handheld electronic device 102 and the proxy surface are nearly parallel, relatively small movement of the handheld electronic device 102 will not result in disproportionately large movement of the virtual environment 500. Given a maximum incidence angle and a proxy surface as described above, a horizontal distance from the user may be computed at which the maximum incidence angle occurs. When starting to move or drag the virtual environment 500 as described above, if the initial intersection of the virtual ray or beam extending from the handheld electronic device 102 and the virtual object at the second virtual location 500B is further away than the maximum incidence angle allows, a point on the proxy surface 550, in the same direction, and that is as far away as possible but has maximum incidence angle, may be used as the initial intersection point. While dragging, the intersection point may be maintained within this computed distance.

Figure 8:
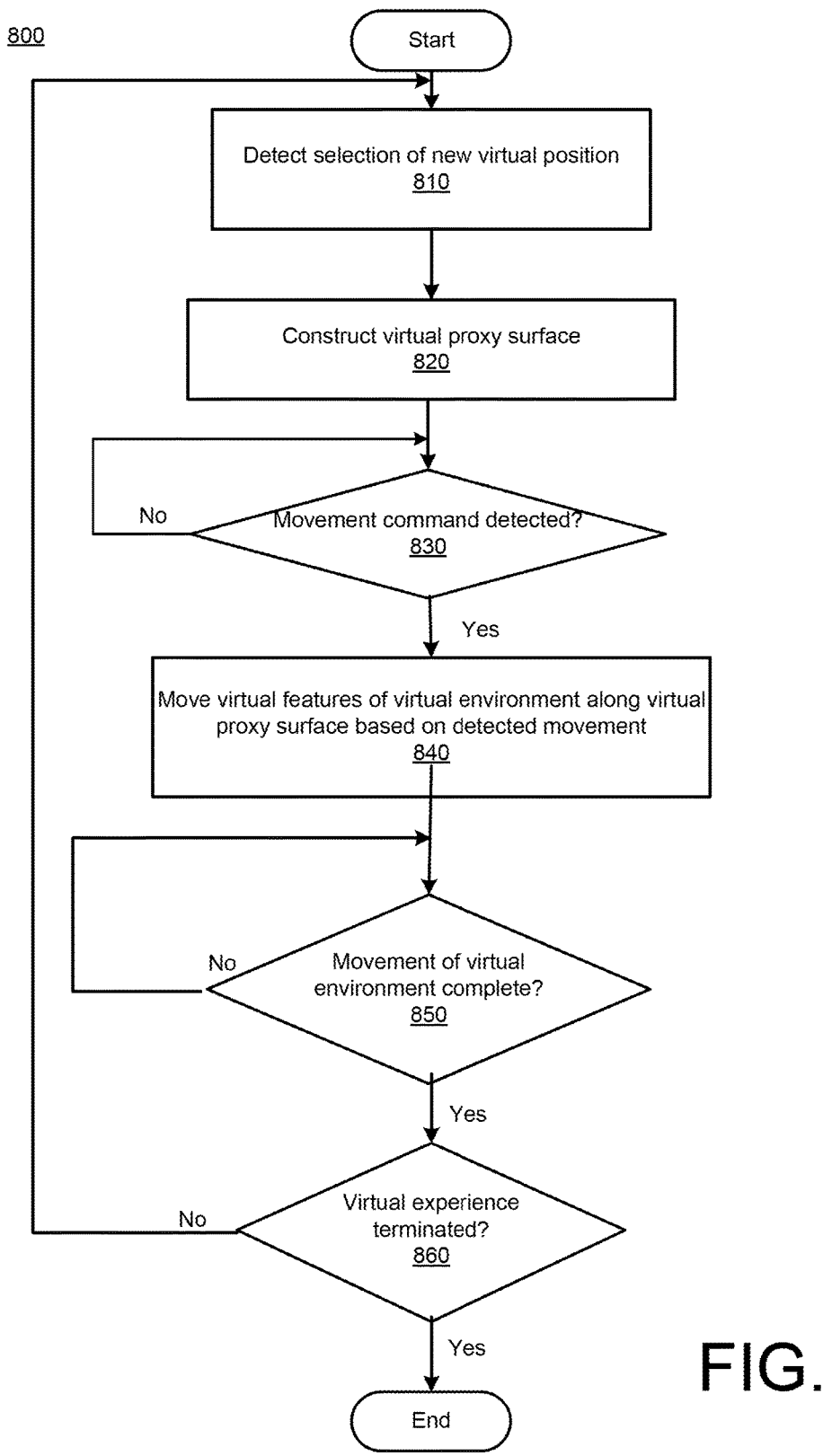
FIG. 8 is a flowchart of a method of moving virtual features in an augmented and/or virtual reality environment, in accordance with implementations as described herein.

A method of moving virtual features of an augmented and/or virtual reality environment, in accordance with implementations as described herein, is shown in FIG. 8. The system may detect a selection of a new virtual location, corresponding to a user input or command to initiate movement of the virtual features of the virtual environment (block 810). This selection may be detected based on, for example, a detected orientation of the handheld electronic device 102 directing a virtual beam or ray at the second virtual position 500B, as described above in detail with respect to FIGS. 4A-4B and 6A-6B. This detection may be made, for example, in response to a detected actuation of a manipulation device 105 of the handheld electronic device 102, as also described above. In response to the detected selection of a new virtual position, the system may construct a complex proxy surface 550 (block 820), as described above in detail with respect to FIGS. 4C-4D and 6C-6D. In response to a detected movement command (block 830), the system may move the virtual elements of the virtual environment along the complex proxy surface (block 840), until it is detected that the movement is complete (block 850). The movement command may include, for example, a movement of the handheld electronic device 102, after selection of the second virtual position 500, and with the manipulation device 105 actuated. The system may move the virtual features of the virtual environment 500 along the complex proxy surface 550, while the user remains at substantially the same physical position 400A in the physical space 400. The system may detect that the movement is complete when, for example, a position of the user (the user, holding the handheld electronic device 102) corresponds to the second virtual position 500B, and/or a release of the manipulation device 105 of the handheld electronic device 102 is detected, a set position of the handheld electronic device 102 is detected, and the like. This process may be performed until it is determined that the virtual reality experience has been terminated (block 860).

Figure 9:
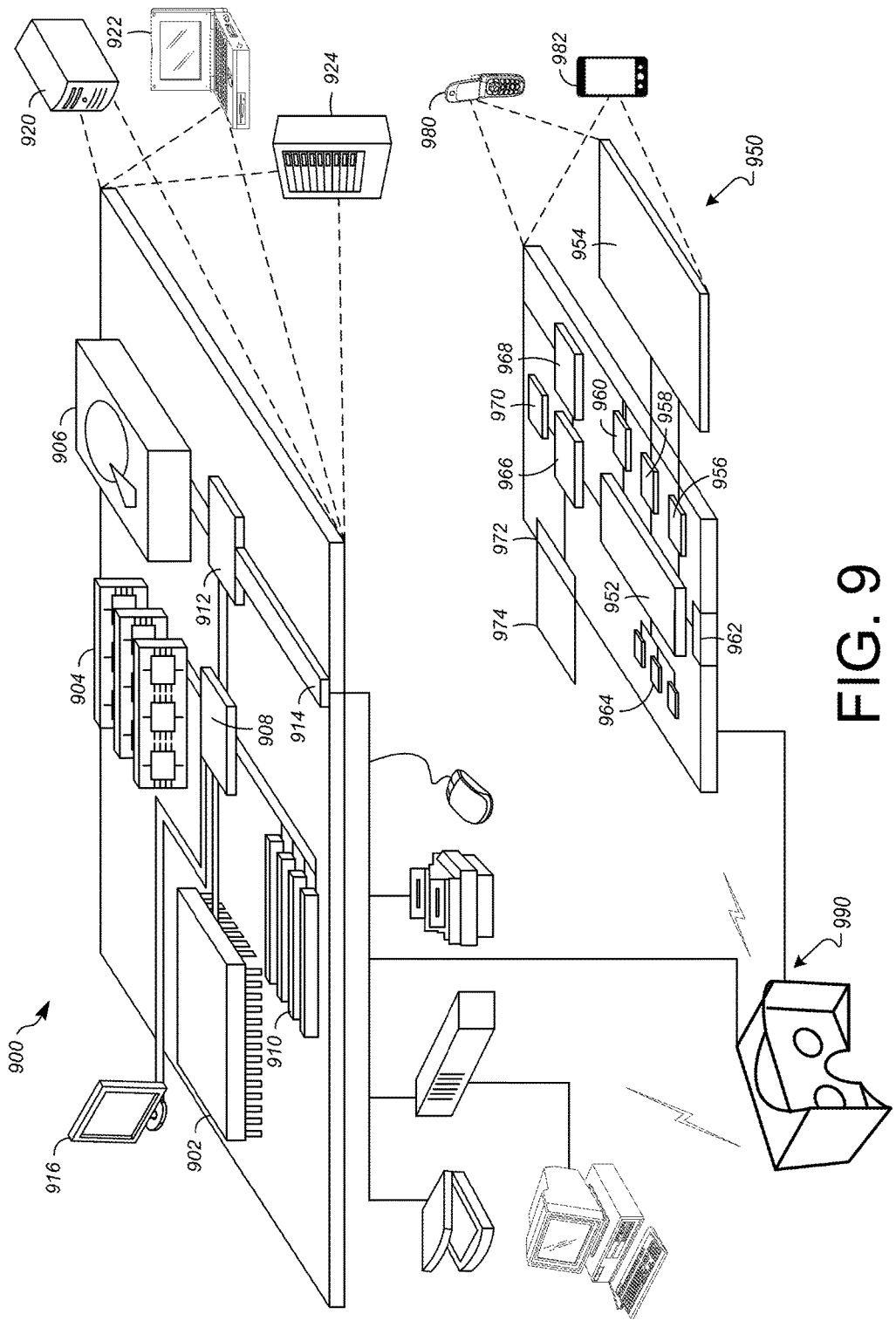
FIG. 9 shows an example of a computer device and a mobile computer device that can be used to implement the techniques described herein.

FIG. 9 shows an example of a computer device 900 and a mobile computer device 950, which may be used with the techniques described here. Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 9 can include sensors that interface with a virtual reality (VR headset/HMD device 990). For example, one or more sensors included on a computing device 950 or other computing device depicted in FIG. 9, can provide input to VR headset 990 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 950 can use the sensors to determine an absolute position and/or a detected rotation of the computing device in the VR space that can then be used as input to the VR space. For example, the computing device 950 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 950 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 950 when the computing device is incorporated into the VR space can cause a particular action to occur in the VR space.

In some implementations, a touchscreen of the computing device 950 can be rendered as a touchpad in VR space. A user can interact with the touchscreen of the computing device 950. The interactions are rendered, in VR headset 990 for example, as movements on the rendered touchpad in the VR space. The rendered movements can control virtual objects in the VR space.

In some implementations, one or more output devices included on the computing device 950 can provide output and/or feedback to a user of the VR headset 990 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 950 may appear as another object in a computer-generated, 3D environment. Interactions by the user with the computing device 950 (e.g., rotating, shaking, touching a touchscreen, swiping a finger across a touch screen) can be interpreted as interactions with the object in the VR space. In the example of the laser pointer in a VR space, the computing device 950 appears as a virtual laser pointer in the computer-generated, 3D environment. As the user manipulates the computing device 950, the user in the VR space sees movement of the laser pointer. The user receives feedback from interactions with the computing device 950 in the VR environment on the computing device 950 or on the VR headset 990.

In some implementations, a computing device 950 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 900 is intended to represent various forms of digital computers and devices, including, but not limited to laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
displaying, in a head mounted display (HMD) device operating in a physical environment, a virtual environment from a first virtual perspective, the first virtual perspective corresponding to a first virtual position;
detecting a selection of a second virtual position;
defining a three-dimensional (3D) virtual proxy surface in response to the detected selection of the second virtual position, wherein the 3D virtual proxy surface includes a 3D right circular conical portion, wherein an apex of the 3D right circular conical portion is located at the first virtual position, a base of the 3D right circular conical portion intersects with the second virtual position, and the axis of the 3D right circular conical portion is oriented corresponding to a virtual height of the virtual environment;
detecting a movement command;
moving virtual features of the virtual environment along the 3D virtual proxy surface in response to the detected movement command; and
displaying the virtual environment from a second virtual perspective, the second virtual perspective corresponding to the second virtual position.

2. The method of claim 1, wherein defining the 3D virtual proxy surface includes:
detecting the first virtual position based on a position of a handheld electronic device, the handheld electronic device being operably coupled to the HMD;
detecting the second virtual position based on an orientation of the handheld electronic device; and
defining the 3D virtual proxy surface based on a 360 degree rotation of a virtual line extending between the first virtual position and the second virtual position.

3. The method of claim 2, wherein
detecting the first virtual position, includes:
detecting the position of the handheld electronic device in the physical environment; and
mapping the detected position of the handheld electronic device in the physical environment to the first virtual position in the virtual environment; and
detecting the selection of the second virtual position includes:
detecting the orientation of the handheld electronic device in the physical environment;
mapping the detected orientation of the handheld electronic device in the physical environment to a corresponding orientation of the handheld electronic device in the virtual environment; and
detecting an intersection of a virtual beam extending from the handheld electronic device and the second virtual position based on the orientation of the handheld electronic device in the virtual environment.

4. The method of claim 3, wherein defining the 3D virtual proxy surface includes:
defining the 3D right circular conical portion of the 3D virtual proxy surface, in which a virtual base of the 3D right circular conical portion is oriented parallel to an x-y plane of the physical environment; and
defining a spherical portion of the 3D virtual proxy surface, the spherical portion extending from the 3D right circular conical portion of the 3D virtual proxy surface.

5. The method of claim 4, wherein
defining the 3D spherical portion of the 3D virtual proxy surface includes defining the 3D spherical portion of the 3D virtual proxy surface extending outward from an outer edge of the 3D right circular conical portion of the 3D virtual proxy surface, at an intersection with the second virtual position.

6. The method of claim 3, wherein moving the virtual features of the virtual environment along the 3D virtual proxy surface includes moving a display of the virtual features of the virtual environment along a path corresponding to the 3D virtual proxy surface so as to shift a perspective of the virtual environment from the first virtual position to the second virtual position.

7. The method of claim 6, wherein a direction of the movement of the virtual features of the virtual environment along the 3D virtual proxy surface corresponds to a direction of a physical movement of the handheld electronic device in the physical environment.

8. The method of claim 6, wherein a rate of the movement of the virtual features of the virtual environment along the 3D virtual proxy surface corresponds to a rate of a physical movement of the handheld electronic device in the physical environment.

9. The method of claim 1, wherein detecting the movement command includes:
detecting actuation of a manipulation device of a handheld electronic device, the handheld electronic device being operably coupled to the HMD;
detecting a physical movement of the handheld electronic device with the manipulation device in the actuated state; and
detecting the movement command in response to the detected physical movement of the handheld electronic device with the manipulation device in the actuated state.

10. The method of claim 9, wherein detecting the movement command in response to the detected physical movement of the handheld electronic device includes:
detecting a magnitude and a direction of the detected physical movement of the handheld electronic device; and
moving the virtual features of the virtual environment in accordance with the detected magnitude and detected direction of the detected physical movement of the handheld electronic device.

11. A computer program product embodied on a non-transitory computer readable medium, the computer readable medium having stored thereon a sequence of instructions which, when executed by a processor, causes the processor to execute a method, the method comprising:
displaying, in a head mounted display (HMD) device operating in a physical environment, a virtual environment from a first virtual perspective, the first virtual perspective corresponding to a first virtual position;
detecting a selection of a second virtual position;
defining a three-dimensional (3D) virtual proxy surface in response to the detected selection of the second virtual position, wherein the 3D virtual proxy surface includes a 3D right circular conical portion, wherein an apex of the 3D right circular conical portion is located at the first virtual position, a base of the 3D right circular conical portion intersects with the second virtual position, and the axis of the 3D right circular conical portion is oriented corresponding to a virtual height of the virtual environment;

detecting a movement command;

moving virtual features of the virtual environment along the 3D virtual proxy surface in response to the detected movement command; and displaying the virtual environment from a second virtual perspective, the second virtual perspective corresponding to the second virtual position.

12. The computer program product of claim 11, wherein defining the 3D virtual proxy surface includes:

detecting the first virtual position based on a position of a handheld electronic device the handheld electronic device being operably coupled to the HMD;

detecting the second virtual position based on an orientation of the handheld electronic device; and defining the 3D virtual proxy surface based on a 360 degree rotation of a virtual connection line extending between the first virtual position and the second virtual position.

13. The computer program product of claim 12, wherein detecting the first virtual position, includes:

detecting the position of the handheld electronic device in the physical environment; and mapping the detected position of the handheld electronic device in the physical environment to the first virtual position in the virtual environment; and detecting the selection of the second virtual position includes:

detecting the orientation of the handheld electronic device in the physical environment;

mapping the detected orientation of the handheld electronic device in the physical environment to a corresponding orientation of the handheld electronic device in the virtual environment; and detecting an intersection of a virtual beam extending from the handheld electronic device and the second virtual position based on the orientation of the handheld electronic device in the virtual environment.

14. The computer program product of claim 13, wherein defining the 3D virtual proxy surface includes:

defining the 3D right circular conical portion of the 3D virtual proxy surface, in which a virtual base of the 3D right circular conical portion is oriented parallel to an x-y plane of the physical environment; and defining a spherical portion of the 3D virtual proxy surface, the spherical portion extending from the 3D right circular conical portion of the 3D virtual proxy surface.

15. The computer program product of claim 14, wherein defining the 3D spherical portion of the 3D virtual proxy surface includes defining the 3D spherical portion of the 3D virtual proxy surface extending outward from an outer edge of the 3D conical portion of the 3D virtual proxy surface, at an intersection with the second virtual position.

16. The computer program product of claim 13, wherein moving the virtual features of the virtual environment along the 3D virtual proxy surface includes moving a display of the virtual features of the virtual environment along a path corresponding to the 3D virtual proxy surface so as to shift a perspective of the virtual environment from the first virtual position to the second virtual position.

17. The computer program product of claim 16, wherein a direction of the movement of the virtual features of the virtual environment along the 3D virtual proxy surface corresponds to a direction of a physical movement of the handheld electronic device in the physical environment.

18. The computer program product of claim 16, wherein a rate of the movement of the virtual features of the virtual environment along the 3D virtual proxy surface corresponds to a rate of a physical movement of the handheld electronic device in the physical environment.

19. The computer program product of claim 11, wherein detecting the movement command includes:

detecting actuation of a manipulation device of a handheld electronic device, the handheld electronic device being operably coupled to the HMD;

detecting a physical movement of the handheld electronic device with the manipulation device in the actuated state; and detecting the movement command in response to the detected physical movement of the handheld electronic device with the manipulation device in the actuated state.

20. The computer program product of claim 19, wherein detecting the movement command in response to the detected physical movement of the handheld electronic device includes:

detecting a magnitude and a direction of the detected physical movement of the handheld electronic device; and moving the virtual features of the virtual environment in accordance with the detected magnitude and detected direction of the detected physical movement of the handheld electronic device.

* * * * *

UNITED STATES PATENT AND TRADEMARK OFFICE
CERTIFICATE OF CORRECTION

| | | |
|---|---|---|
| PATENT NO. | : 10,359,863 B2 | Page 1 of 1 |
| APPLICATION NO. | : 15/684314 | |
| DATED | : July 23, 2019 | |
| INVENTOR(S) | : Seegmiller et al. | |

It is certified that error appears in the above-identified patent and that said Letters Patent is hereby corrected as shown below:

On the Title Page

Column 2, Item (56), under "OTHER PUBLICATIONS", Line 1, delete "et al." and insert -- et al., --, therefor.

In the Claims

In Column 17, Claim 1, Line 23, delete "the axis" and insert -- an axis --, therefor.

In Column 17, Claim 1, Line 24, delete "height" and insert -- height direction --, therefor.

In Column 19, Claim 11, Line 1, delete "the axis" and insert -- an axis --, therefor.

Signed and Sealed this
Tenth Day of September, 2019

Andrei Iancu
*Director of the United States Patent and Trademark Office*